United States Patent
Tame et al.

(10) Patent No.: US 7,165,801 B2
(45) Date of Patent: Jan. 23, 2007

(54) STOW IN FLOOR SEAT ASSEMBLY WITH AUTOMATIC LATERAL DISPLACEMENT

(75) Inventors: Omar D. Tame, West Bloomfield, MI (US); Carl J. Holdampf, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/528,539

(22) PCT Filed: Sep. 22, 2003

(86) PCT No.: PCT/US03/29458

§ 371 (c)(1),
(2), (4) Date: Oct. 3, 2005

(87) PCT Pub. No.: WO2004/026619

PCT Pub. Date: Apr. 1, 2004

(65) Prior Publication Data

US 2006/0138796 A1 Jun. 29, 2006

Related U.S. Application Data

(60) Provisional application No. 60/412,635, filed on Sep. 20, 2002.

(51) Int. Cl.
*B60N 2/06* (2006.01)
(52) U.S. Cl. .............. 296/65.09; 296/65.05; 296/65.11; 297/335
(58) Field of Classification Search ............ 296/65.01, 296/65.05, 65.11, 65.16, 65.09; 297/331, 297/334, 335
See application file for complete search history.

(56) References Cited

U.S. PATENT DOCUMENTS

| 1,471,001 | A | 10/1923 | Nicholson |
| 1,510,969 | A | 10/1924 | Watrous |
| 5,498,051 | A | 3/1996 | Sponsler et al. |
| 5,868,451 | A | 2/1999 | Uno et al. |
| 6,113,175 | A | 9/2000 | Guim et al. |
| 6,382,491 | B1 | 5/2002 | Hauser et al. |
| 6,981,744 | B2 * | 1/2006 | Elterman et al. |

FOREIGN PATENT DOCUMENTS

| DE | 43 42 438 | 12/1993 |
| FR | 2 704 494 | 4/1993 |

* cited by examiner

*Primary Examiner*—Stephen Gordon
(74) *Attorney, Agent, or Firm*—Clark Hill PLC

(57) ABSTRACT

A seat assembly for supporting an occupant above a floor of an automotive vehicle includes a seat cushion extending laterally between spaced apart side members. The seat cushion includes a front cross member extending between the side members. Inboard and outboard front legs are each pivotally assembled at one end to the front cross member for pivotal movement of the seat cushion relative to the front legs between a seating position and forwardly dumped positions. A boss protrudes outwardly from the front cross member for pivotal movement therewith relative to the front legs. A guide flange is fixedly secured to one of the front legs and has a cam surface cammingly engagable with the boss for automatically laterally displacing the seat cushion in response to pivotal movement of the seat cushion relative to the front legs between the seating and forwardly dumped positions.

15 Claims, 6 Drawing Sheets

STOW IN FLOOR SEAT ASSEMBLY WITH AUTOMATIC LATERAL DISPLACEMENT

This application is a 371 of PCT/US03/29458 Sep. 22, 2003 which claims benefit of provisional application 60/412,635 Sep. 20, 2002.

BACKGROUND OF THE INVENTION

1. Field of the Invention

The invention relates to a seat assembly for an automotive vehicle, and more particularly, to a riser assembly for automatically displacing the seat cushion laterally in response to pivotal movement of the seat cushion between a seating position and a forwardly dumped position.

2. Description of the Related Art

Automotive vehicles include seat assemblies for supporting occupants within the vehicle. Seat assemblies include a seat cushion and a seat back operatively coupled to the seat cushion by a recliner mechanism for allowing selective pivotal adjustment of the seat back relative to the seat cushion between a plurality of reclined seating positions. Typically, the seat back is also movable between any one of the reclined seating positions and a generally horizontal, forwardly stowed position to present a load floor surface on the back of the seat back.

It is known in the automotive seating art to mount a riser assembly between the seat cushion and the floor of the vehicle for moving the seat assembly between a seating position with the seat cushion spaced above the floor of the vehicle and a forwardly stowed position with the seat cushion disposed generally forward of the seating position and lying against the floor of the vehicle. It is also known for such a riser assembly to allow movement of the seat assembly between the seating position and a stowed position within a recess in the floor of the vehicle. However, it remains desirable to have a riser assembly that allows movement of the seat assembly between the seating position and a stowed position that is laterally offset from the seating position.

SUMMARY OF THE INVENTION

According to one aspect of the invention a seat assembly is provided for supporting an occupant above a floor of an automotive vehicle. The seat assembly includes a seat cushion extending laterally between spaced apart side members. The seat cushion includes a front cross member extending between the side members. A front leg is pivotally assembled at one end to the front cross member for pivotal movement of the seat cushion relative to the front leg between a seating position and a forwardly dumped positions. A boss protrudes outwardly from the front cross member for pivotal movement therewith relative to the front leg. A guide flange is fixedly secured to the front leg and has a cam surface cammingly engagable with the boss for automatically laterally displacing the seat cushion in response to pivotal movement of the seat cushion relative to the front leg between the seating and forwardly dumped positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
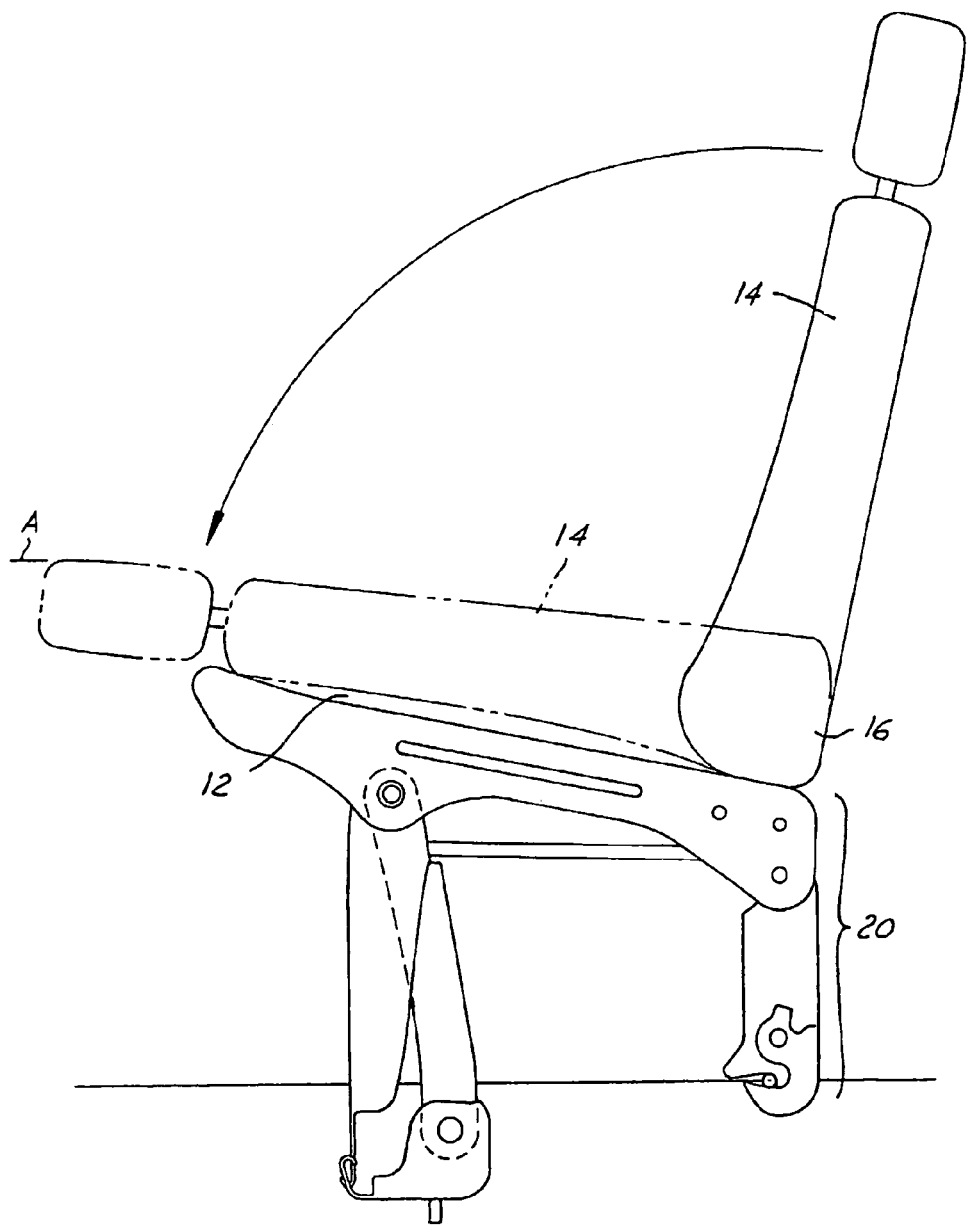
FIG. 1 is a side view of a seat assembly incorporating a riser assembly according to one aspect of the invention.

Referring to the figures, a seat assembly for an automotive vehicle is generally indicated at 10 in FIG. 1. The seat assembly 10 includes a seat cushion 12 for supporting an occupant above a floor in the vehicle and a seat back 14 for supporting the back of the occupant seated on the seat cushion 12. A recliner assembly 16 is coupled between the seat cushion 12 and the seat back 14 for providing selective locking and pivotal adjustment of the seat back 14 relative to the seat cushion 12 between a plurality of generally upright seating positions and a forwardly folded flat position, indicated as A in FIG. 1, overlying the seat cushion 12. Described in greater detail below, the seat assembly 10 includes a riser assembly 20 coupled between seat cushion 12 and the floor of the vehicle that allows movement of the seat assembly 10 between a seating position and a forwardly dumped position, indicated as B in FIG. 2, offset laterally inboard in the vehicle relative to the seating position. The riser assembly 20 also allows movement of the seat assembly between the forwardly dumped position B and a forwardly stowed position, indicated as C in FIG. 2, preferably nested within a recess in the floor that is offset laterally inboard in the vehicle relative to the seating position. Alternatively, the forwarding stowed position may be resting against the upper surface of the floor.

Figure 2:
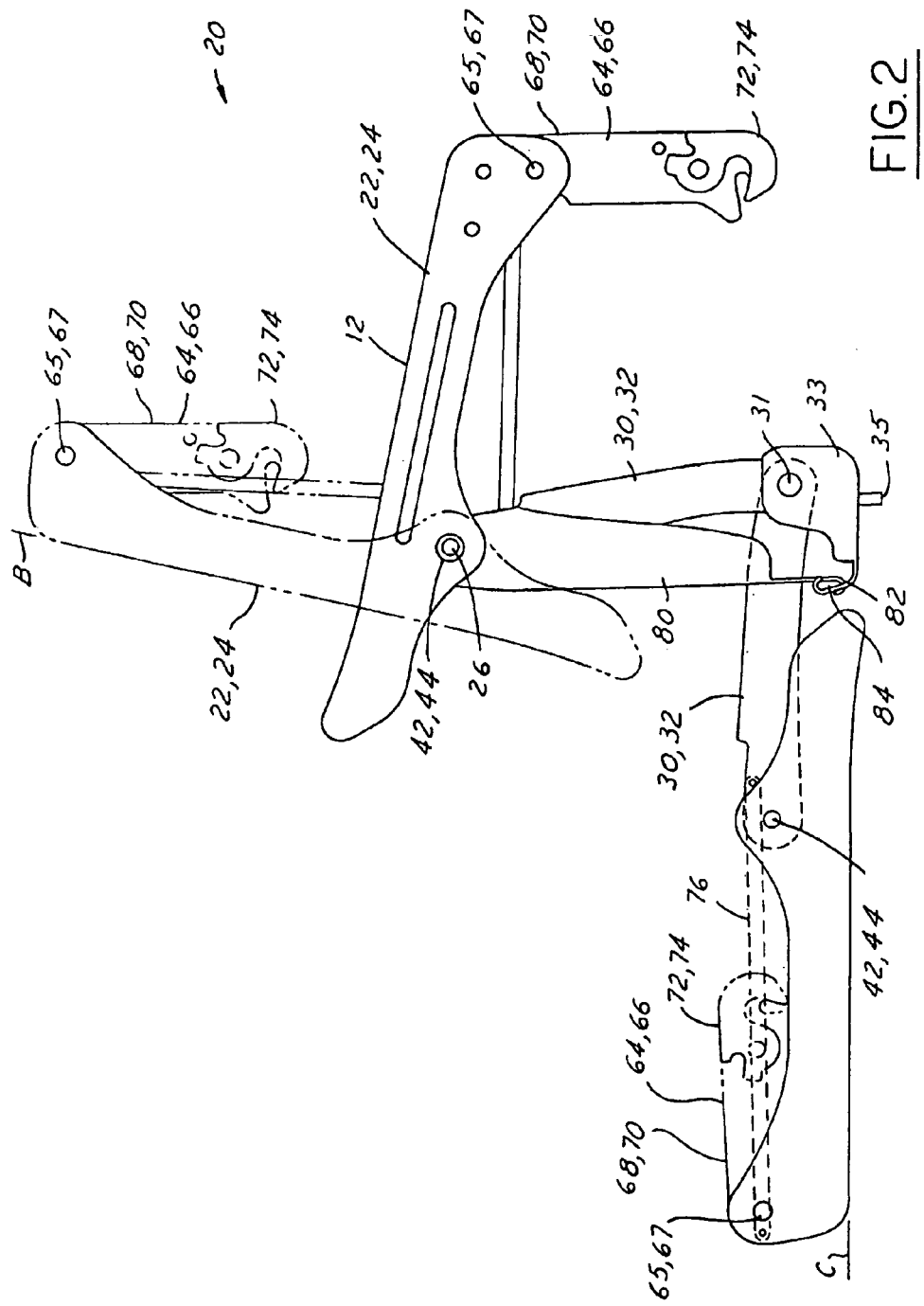
FIG. 2 is a side view of the seat assembly.
Figure 3:
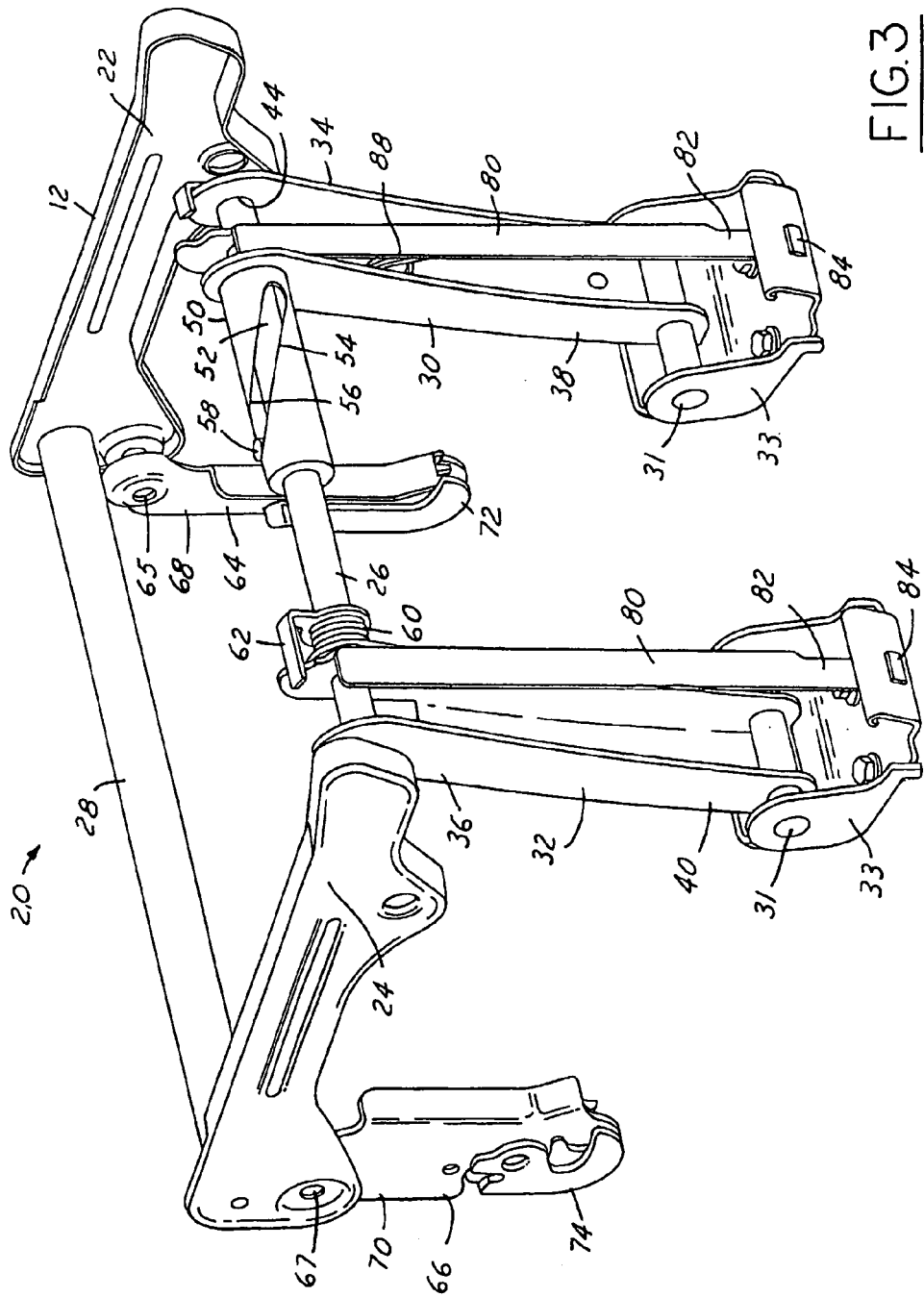
FIG. 3 is a perspective view of the riser assembly.

Referring to FIGS. 2 and 3, the seat cushion 12 includes generally parallel inboard 22 and outboard 24 side members. Front 26 and rear 28 cross members are fixedly secured to and extend axially between the inboard 22 and outboard 24 side members. Preferably, the front cross member 26 is cylindrical.

The riser assembly 20 includes generally parallel inboard 30 and outboard 32 front legs extending between the front cross member 26 and pivot pins 31 fixedly supported by brackets 33. The brackets 33 are fixedly secured to the floor of the vehicle by bolts 35, or other suitable fastener or methods, such as welding. Each front leg 30, 32 extends between an upper end 34, 36 and an opposite lower end 38, 40. The lower end 38, 40 of each front leg 30, 32 is pivotally coupled to one of the respective pivot pins 31 in the floor of the vehicle for movement of the front legs 30, 32 between a support position extending generally vertically between the front cross member 26 and the floor of the vehicle and a forwardly folded position generally aligned with the floor of the vehicle, or alternatively, nested within recesses formed in the floor of the vehicle.

A bore 42, 44 is formed in the upper end 34, 36 of each front leg 30, 32. The bores 42, 44 of each front leg 30, 32 are aligned coaxially for receiving the front cross member 26 therethrough and allowing relative pivotal movement between the front legs 30, 32 and the seat cushion 12. The front cross member 26 is also axially slidable within each bore 42, 44 for allowing lateral inboard and outboard displacement of the seat cushion 12 relative to the front legs 30, 32.

A guide flange or tube 50 is fixedly secured to the upper end 34 of the inboard front leg 30. The guide tube 50 is preferably cylindrical and aligned axially with the bores 42, 44 for rotatably and slidably receiving the front cross member 26 therethrough. A guide slot 52 is formed in the guide tube 50. The guide slot 52 is defined by spaced apart and generally helical first 54 and second 56 cam surfaces. A boss 58 protrudes generally radially from the front cross member 26 through the guide slot 52. The boss 58 rotates with the front cross member 26 and engages the first cam surface 54 during movement of the seat cushion 12 from the seating position to the forwardly dumped position. The engagement between the boss 58 and the first cam surface 54 causes the seat cushion 12 to move laterally inwardly in response to the pivotal movement of the seat cushion 12 between the seating and forwardly dumped positions. Similarly, the boss 58 rotates with the front cross member 26 and engages the second cam surface 56 during pivotal movement of the seat cushion 12 from the forwardly dumped position to the seating position. The engagement between the boss 58 and the second cam surface 56 causes the seat cushion 12 to move laterally outwardly in response to the pivotal movement of the seat cushion 12 between the seating and forwardly dumped positions.

An assist spring 60 is coupled between a bracket 62 fixedly secured to the front cross member 26 and the outboard front leg 32 for assisting movement the seat cushion 12 between the seating and forwardly dumped positions.

The riser assembly 20 further includes generally parallel inboard 64 and outboard 66 rear legs each extending between an upper end 68, 70 and an opposite lower end 72, 74. The upper ends 68, 70 of the inboard 64 and outboard 66 rear legs are pivotally assembled to the respective inboard 22 and outboard 24 side members by pivot pins 65, 67 for pivotal movement of the rear legs 64, 66 between a support position extending generally vertically between the seat cushion 12 and the floor of the vehicle and a stowed position aligned with the side members 22, 24, as best illustrated by the seat cushion 12 in the forwardly dumped position B in FIG. 2. The lower end 72, 74 of each rear leg 64, 66 is selectively latchable to a respective striker bar fixedly secured to the floor of the vehicle and releasable therefrom by a release lever, as understood by persons of ordinary skill in the art. A link 76 extends between each rear leg 64, 66 and a respective front leg 30, 32 for moving the rear legs 64, 66 between the support and stowed positions in response to movement of the seat cushion 12 between the seating and forwardly stowed positions, respectively. Alternatively, a single link interconnects one of the rear legs 64, 66 to one of the front legs 30, 32 and a rod interconnects the rear legs 64, 66 together so that both rear legs 64, 66 move between the support and stowed positions in response to the movement of the seat cushion 12 between the seating and forwardly stowed positions, respectively.

A plurality of braces or stands 80, preferably one corresponding to each front leg 30, 32 and bracket 33, each extend between a hook-shaped lower end 82 selectively engaged with a slot 84 formed in one of the respective brackets 33 and an upper end 86 pivotally coupled to the front cross member 26 for moving the lower end 82 in and out of engagement with the slot 84. While engaged with the slot 84, the stands 80 maintain the seat cushion 12 in the seating position. A biasing member 88, such as a clock spring or other suitable biasing means, extends between each front leg 30, 32 and one of the corresponding stands 80 for biasing the lower end 82 of the stand 80 toward engagement with the slot 84. The seat cushion 12 engages the stands 80 during movement between the seating and forwardly dumped positions to move the lower ends 82 of the stands 80 in and out of engagement, respectively, with the slots 84 against the force applied by the biasing member 88.

In use, the front 30, 32 and rear 64, 66 legs extend generally vertically in the support position to support the seat cushion 12 in the seating position. The lower end 82 of each stand 80 is engaged with the slot 84 in the bracket 33 to maintain the seat cushion 12 in the seating position. The biasing member 88 maintains the lower end 82 engaged with the slot 84.

To move the seat cushion 12 between the seating and forwardly dumped positions, the lower end 72, 74 of each rear leg 64, 66 is released from latching engagement with the striker bars fixedly secured to the floor of the vehicle. As the seat cushion 12 is pivotally moved from the seating position toward the forwardly dumped position, the boss 58 rotates with the front cross member 26 and engages the first cam surface 54 of the guide tube 50; in response, the first cam surface 54 acts upon the boss 58 and displaces the seat cushion 12 laterally inwardly relative to the front legs 30, 32. At the same time, the link 76 pulls the rear legs 64, 66 from the support position to the stowed position in response to movement of the seat cushion 12 from the seating position to the forwardly dumped position.

When the seat cushion 12 is returned from the forwardly dumped position to the seating position, the boss 58 rotates with the front cross member 26 and engages the second cam surface 56 of the guide tube 50; in response, the second cam surface 56 acts upon the boss 58 and displaces the seat cushion 12 laterally outwardly relative to the front legs 30, 32. At the same time, the link 76 pushes the rear legs 64, 66 from the stowed position to the support position in response to the movement of the seat cushion 12 from the forwardly dumped position to the seating position. The lower ends 72, 74 latchingly engage the striker bars fixedly secured to the floor of the vehicle to lock the seat cushion 12 in the seating position.

Instead of returning the seat cushion 12 to the seating position, the seat back 14 may be moved to the forwardly folded flat position overlying the seat cushion 12 and the seat cushion 12 may be moved between the forwardly dumped position and forwardly stowed position. The seat cushion 12 in the forwardly dumped position engages the stands 80 at the top ends of the stand and pivots the lower ends 82 of the stands to disengage from the slots 84. Then, the front legs 30, 32 are freely movable about the pivot pins 31 to allow movement of the seat cushion 12 together with the seat back 14 between the forwardly dumped position and the forwardly stowed position nested within the recess in the floor of the vehicle.

Figure 4:
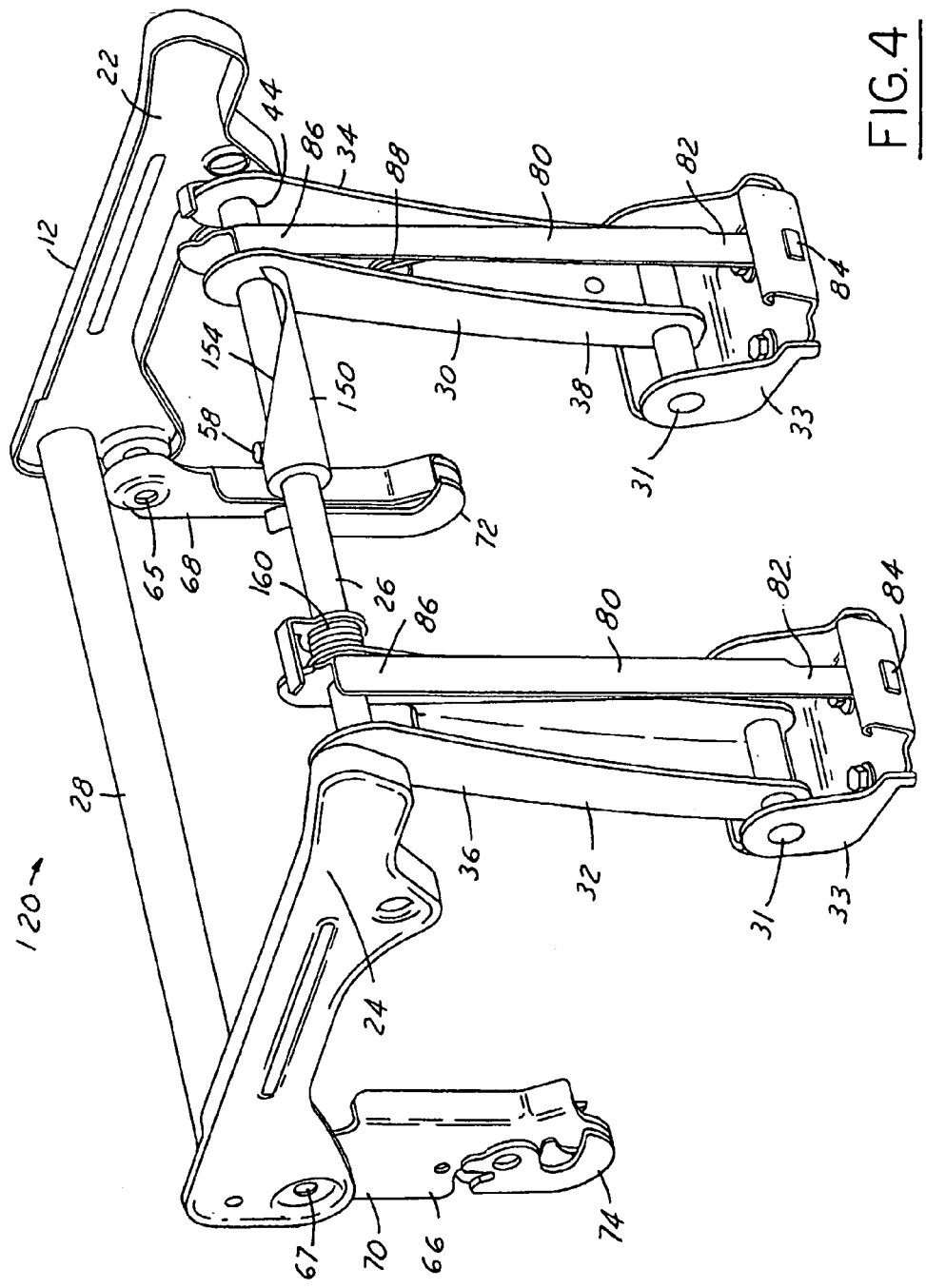
FIG. 4 is a perspective view of a second embodiment of the riser assembly.

Referring to FIG. 4, a second embodiment of the riser assembly 120 is shown for laterally displacing the seat cushion 12 outwardly and inwardly in response to movement of the seat cushion 12 between the seating and forwardly dumped positions, respectively. A guide flange 150 is fixedly secured to the upper end of the inboard front leg 30. The guide flange 150 includes a helically shaped cam surface 154 formed therein for cammingly engaging the boss 58 during movement of the seat cushion 12 between the seating and forwardly dumped position. An energized biasing member 160 extends between the seat cushion 12 and one of either the outboard 32 or inboard 30 front legs for biasing the seat cushion 12 laterally outwardly.

It should be appreciated that the profiles of the first cam surface 54, the second cam surface 56, and the cam surface 154 are preferably helical, but can be any suitable shape necessary to achieve a predetermined amount of lateral displacement of the seat cushion 12 in response to a predetermined range of pivotal movement of the seat cushion 12.

Figure 5:
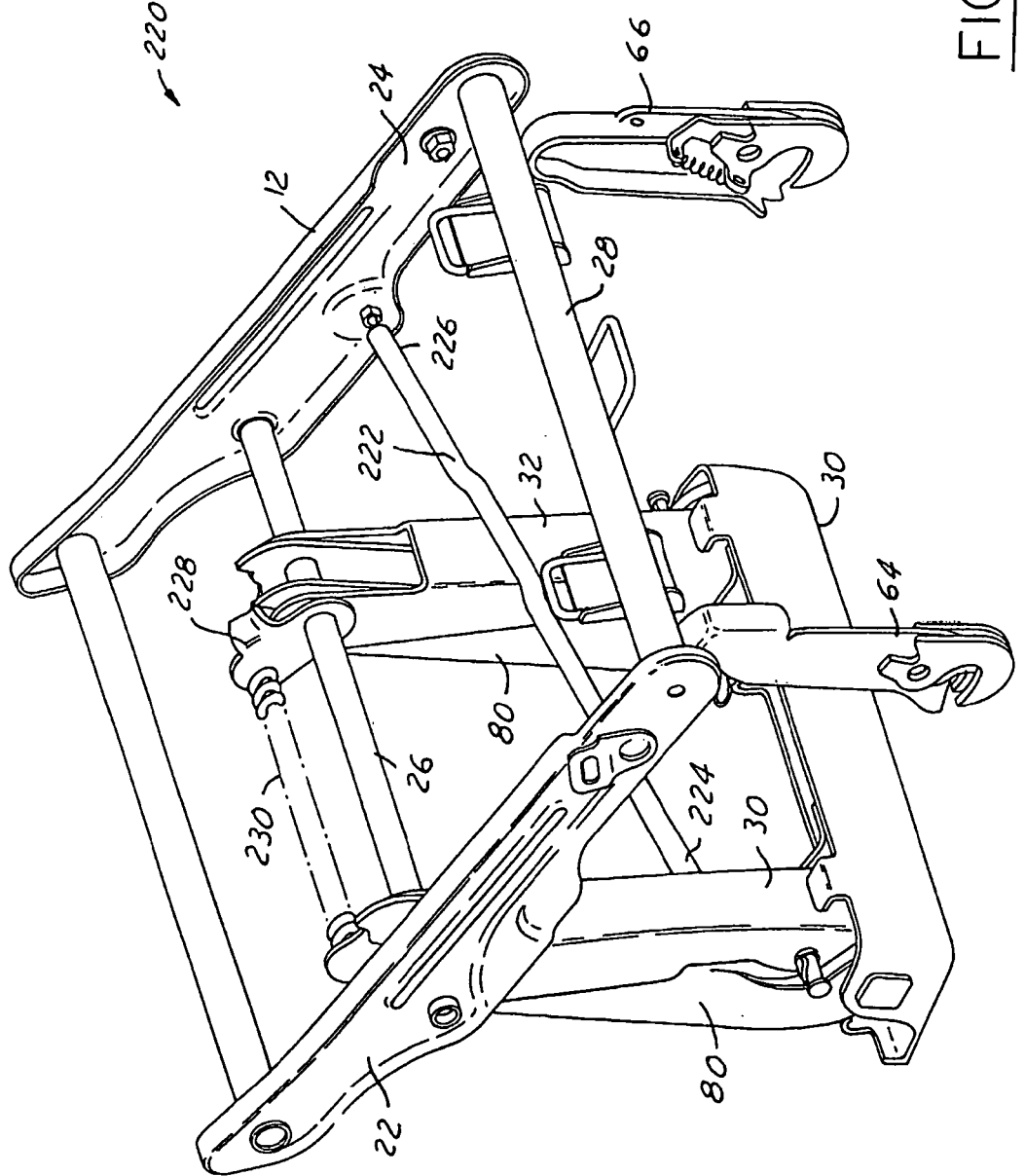
FIG. 5 is a perspective view of a third embodiment of the riser assembly.
Figure 6:
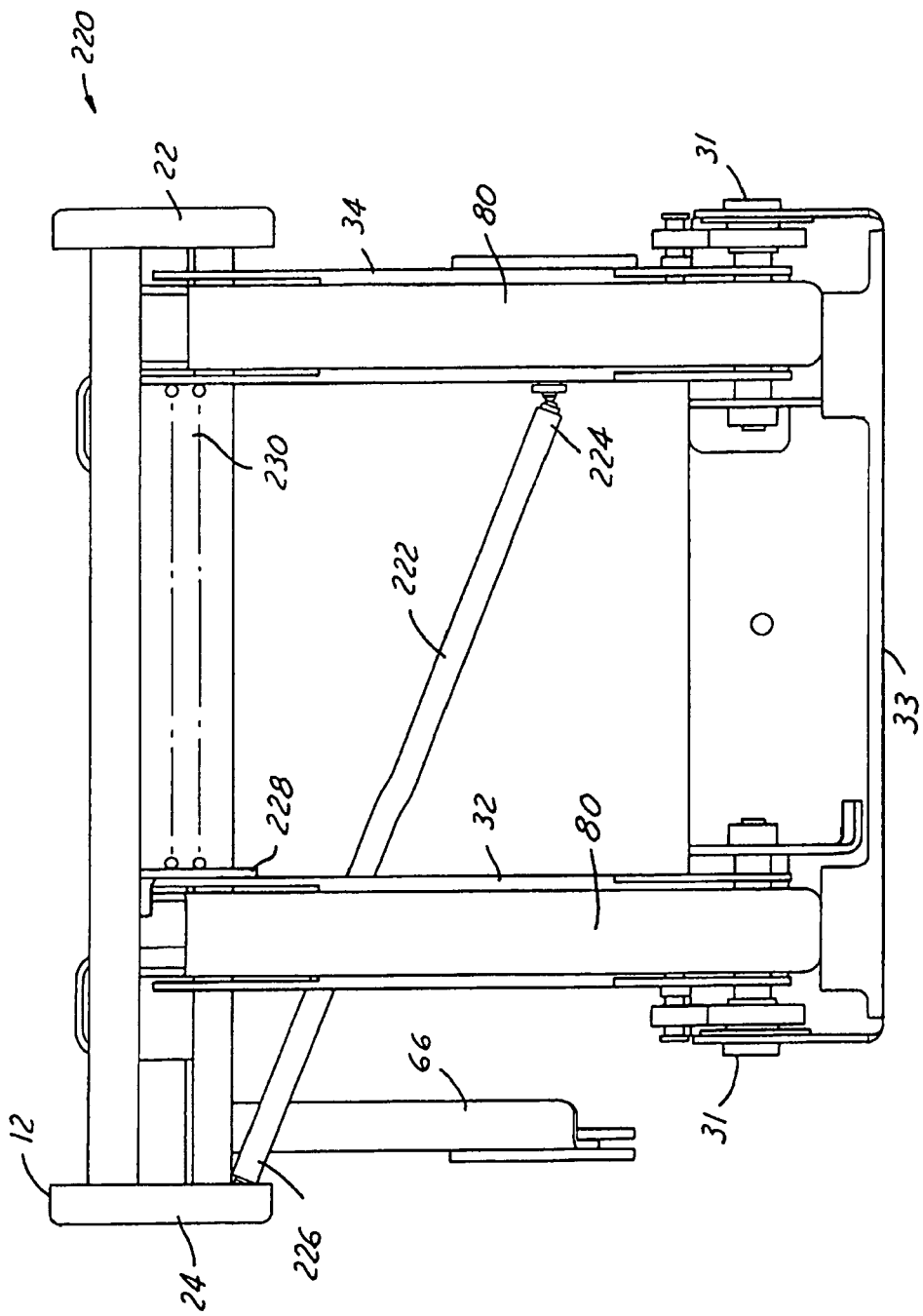
FIG. 6 is a front view of the third embodiment of the riser assembly.

Referring to FIGS. 5 and 6, a third embodiment of the riser assembly 220 is shown. The riser assembly 220 includes a rod 222 extending generally laterally between the inboard front leg 30 and the outboard side member 24. The rod 222 pulls and pushes the seat cushion 12 laterally inwardly and outwardly relative to the front legs 30, 32 in response to the pivotal movement of the seat cushion 12 between the forwardly dumped and seating positions, respectively. More specifically, the rod 222 extends axially between inboard 224 and outboard 226 ends. The inboard end 224 of the rod 222 is rotatably coupled to the inboard front leg 32. Similarly, the outboard end 226 of the rod 222 is rotatably coupled to the outboard side member 24. The effective length of the rod 222 shortens as the seat cushion 12 rotates about the front legs 32; thereby resulting in the lateral displacement of the seat cushion 12. As the seat cushion 12 is moved to the forwardly dumped position from the seating position, the effective length of the rod 222 decreases forcing the seat cushion 12 laterally inward. Conversely, as the seat cushion 12 is returned to the seating position from the forwardly dumped position the effective length of the rod 22 is increased resulting in the outward lateral displacement of the seat cushion 12.

An abutment bracket 228 is fixedly secured to the front cross member 26. A biasing member 230 is energized in compression between the inboard front leg 30 and the abutment bracket 228 for biasing the seat cushion 12 laterally outwardly. Alternatively, the biasing member 230 may be tensioned between the inboard front leg 30 and the abutment bracket 228 for biasing the seat cushion 12 laterally inwardly and pivotally toward the forwardly dumped position B.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly (10) comprising:
   a seat cushion (12) having laterally spaced side members (22, 24) and a front cross member (26) connected to and spanning between the side members (22, 24);
   front legs (30, 32) pivotally coupled to the front cross member (26);
   a boss (58) formed on the front cross member (26); and
   a guide tube (50) positioned around the front cross member (26) and attached to the front leg (30), the guide tube (50) including a guide slot (52) adapted to engage the boss (58), wherein the seat cushion (12) is automatically laterally displaced relative to the front legs (30, 32) in response to pivotal movement of the seat cushion (12) relative to the front legs (30, 32).

2. The seat assembly (10) of claim 1 wherein the guide slot (52) comprises a helical cam surface (154).

3. The seat assembly (10) of claim 2 further including a biasing member (160) associated with the front cross member (26) for maintaining engagement of the boss (58) and the helical cam surface (154).

4. The seat assembly (10) of claim 1 wherein the guide slot (52) comprises spaced apart helical cam surfaces (54, 56).

5. The seat assembly (10) of claim 4 wherein the boss (58) is disposed within the guide slot (52) and engages the helical cam surfaces (54, 56) for translating the front cross member (26) laterally.

6. The seat assembly (10) of claim 1 further including front brackets (33) attached to a floor of a vehicle, the front brackets (33) pivotally coupled to the front legs (30, 32).

7. The seat assembly (10) of claim 6 further including front braces (80) attached to the front cross member (26) at a first end (86) and engaging slots (84) formed in the front brackets (33) at a second end (82).

8. The seat assembly (10) of claim 7 further including a biasing member (88) associated with the front leg (30) and a respective one of said front braces (80) for maintaining the second end (82) of the brace (80) in engagement with the respective slot (84) formed in the the respective front bracket (33).

9. The seat assembly (10) of claim 7 wherein pivotal movement of the seat cushion (12) relative to the front legs (30, 32) causes the front braces (80) to disengage from the slots (84) formed in the front brackets (33).

10. The seat assembly (10) of claim 9 wherein further pivotal movement of the seat cushion (12) after disengagement of the front braces (80) from the slots (84) formed in the front brackets (33) allows for positioning the seat assembly (10) in a forward stowed position within a recess formed in the floor of the vehicle.

11. The seat assembly (10) of claim 1 further including rear legs (64, 66) pivotally coupled to the laterally spaced side members (22, 24).

12. The seat assembly (10) of claim 11 further including at least one link (76) connecting one of said rear legs (64) and a front leg (30) for moving the rear legs (64) between a support position and a stowed position in response to pivotal movement of the seat cushion (12).

13. The seat assembly (10) of claim 11 further including a rod connecting the rear legs (64, 66) for coordinating movement of the rear legs (64, 66) between support and stowed positions.

14. The seat assembly (10) of claim 1 further including an assist spring (60) associated with the front cross member (26) and front leg (32) for aiding movement of the seat cushion (12) between seating and forwardly dumped positions.

15. A seat assembly (10) comprising:
   a seat cushion (12) having laterally spaced side members (22, 24) and a front cross member (26) connected to and spanning between the side members (22, 24);
   front legs (30, 32) pivotally coupled to the front cross member (26);
   a boss (58) formed on the front cross member (26); and
   a guide tube (50) positioned around the front cross member (26) and attached to the front leg (30), the guide tube (50) including a guide slot (52) adapted to engage the boss (58), the boss (58) engaging the guide slot (52) in a seating position wherein pivotal movement of the seat cushion (12) to a forwardly dumped position translates to pivotal motion of the front cross member (26) resulting in an interaction of the boss (58) and guide slot (52) for translating the seat cushion (12) laterally.

* * * * *